(12) United States Patent
Singh et al.

(10) Patent No.: US 11,717,960 B2
(45) Date of Patent: Aug. 8, 2023

(54) ANTI-SWAY CONTROL FOR A ROBOTIC ARM WITH ADAPTIVE GRASPING

(71) Applicant: INTELLIGRATED HEADQUARTERS, LLC, Mason, OH (US)

(72) Inventors: Jagtar Singh, Pittsburgh, PA (US); Ramdas M. Pai, Cary, NC (US); Abhijit Makhal, St. Louis, MO (US)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 93 days.

(21) Appl. No.: 17/182,359

(22) Filed: Feb. 23, 2021

(65) Prior Publication Data

US 2021/0260758 A1 Aug. 26, 2021

Related U.S. Application Data

(60) Provisional application No. 62/981,311, filed on Feb. 25, 2020.

(51) Int. Cl.
*B25J 9/16* (2006.01)
*B25J 15/06* (2006.01)
*B25J 13/08* (2006.01)

(52) U.S. Cl.
CPC .......... *B25J 9/1638* (2013.01); *B25J 9/163* (2013.01); *B25J 9/1651* (2013.01); *B25J 9/1653* (2013.01); *B25J 9/1664* (2013.01); *B25J 9/1697* (2013.01); *B25J 13/088* (2013.01); *B25J 15/0616* (2013.01)

(58) Field of Classification Search
CPC ...................................... B25J 9/1638
See application file for complete search history.

(56) References Cited

U.S. PATENT DOCUMENTS

| | | | | |
|---|---|---|---|---|
| 10,843,347 | B1* | 11/2020 | Murphy | B25J 15/0616 |
| 2004/0265110 | A1* | 12/2004 | Schnoor | B25J 9/1638 414/729 |
| 2017/0106534 | A1* | 4/2017 | Nakamoto | B25J 9/1075 |

FOREIGN PATENT DOCUMENTS

WO WO-2021101514 A1 * 5/2021 ............ B25J 9/1664

* cited by examiner

*Primary Examiner* — Nicholas Kiswanto
*Assistant Examiner* — Dylan Brandon Mooney
(74) *Attorney, Agent, or Firm* — Alston & Bird LLP

(57) ABSTRACT

Methods, apparatuses, systems, and computer program products for an improved anti-sway control system and adjustable end effector for a robotic arm are provided. An example method includes determining at least one of a size, shape or orientation of a package to be picked up by an end effector of a robotic arm and facilitating adjusting a position of a suction cup on the end effector, wherein the position is determined based on the at least one determined size, shape, or orientation of the package. The method further includes facilitating grasping the package with the end effector and facilitating movement of the end effector via a robotic joint to reduce force on the suction cup by the package due to an acceleration of the package due to movement of the robotic arm.

20 Claims, 10 Drawing Sheets

ANTI-SWAY CONTROL FOR A ROBOTIC ARM WITH ADAPTIVE GRASPING

CROSS-REFERENCE TO RELATED APPLICATIONS

This application claims the benefit of U.S. Provisional Patent Application No. 62/981,311, filed Feb. 25, 2020, the entire contents of which are incorporated by reference herein.

TECHNICAL FIELD

The present application relates generally to an exemplary anti-sway control system and, in some examples, to a machine learning based anti-sway control system for a robotic arm.

BACKGROUND

In material handling applications that involve robotic manipulators, it can be hard to grip some types of packages at high speeds. Applicant has identified a number of deficiencies and problems associated with conventional robotic manipulators. Through applied effort, ingenuity, and innovation, many of these identified deficiencies and problems have been solved by developing solutions that are structured in accordance with the embodiments of the present disclosure, many examples of which are described in detail herein.

BRIEF SUMMARY

In general, embodiments of the present disclosure provided herein include systems, apparatuses, methods, and computer program products to provide for improved anti-sway control systems for a robotic arm and an adjustable end effector for robotic arms that can reduce the sway due to packages being moved by a robotic arm. In accordance with one exemplary embodiment of the present disclosure, an anti-sway control system comprises a processor and a memory that stores executable instructions that, when executed by the processor, facilitate performance of operations, comprising determining at least one of a size, shape, or orientation of a package to be picked up by an end effector of a robotic arm, adjusting a position of a suction cup on the end effector, wherein the position is determined based on the at least one determined size, shape, or orientation of the package, facilitating grasping the package with the end effector, and facilitating movement of the end effector via a robotic joint to reduce an acceleration of the package due to movement of the robotic arm.

In some embodiments, facilitating movement of the end effector via the robotic joint further comprises oscillating the package in an opposite direction of trajectory motion to counter a force due to movement of the robotic arm. In some further embodiments, the oscillation of the oscillating package is based on an inverse of a transfer function of the motion of the robotic arm to a goal position. In some further embodiments, the oscillation of the oscillating package is facilitated via one or more of rotation of the robotic joint, linear motion of a longitudinal extension of the robotic arm, and swivel motion of the end effector.

In some embodiments, the suction cup is moved to a predetermined location on a rail associated with the end effector.

In some embodiments, determining the at least one size, shape, or orientation of the package is based on analyzing an image of the package.

In some embodiments, the position of the suction cup is adjusted based on a machine learning perception model. In some further embodiments, the position of the suction cup is adjusted based on a surface area of the package to increase grip on the package and bring a center of mass of the package closer to the end effector.

In some embodiments, the robotic joint is a wrist joint. In some further embodiments, the robotic joint is a spherical motor joint.

In accordance with one exemplary embodiment of the present disclosure, a method comprises determining at least one of a size, shape, or orientation of a package to be picked up by an end effector of a robotic arm, facilitating adjusting a position of a suction cup on the end effector, wherein the position is determined based on the at least one determined size, shape, or orientation of the package, facilitating grasping the package with the end effector, and facilitating movement of the end effector via a robotic joint to reduce force on the suction cup by the package due to an acceleration of the package due to movement of the robotic arm.

In some embodiments, determining the at least one size, shape, or orientation of the package is based on analyzing an image of the package.

In some embodiments, the position of the suction cup is adjusted based on a machine learning based perception model. In some further embodiments, the machine learning based perception model is a convolutional neural network trained via historical package image data to determine an optimum placement of the suction cup.

In accordance with one exemplary embodiment of the present disclosure, a robotic arm apparatus for grasping and moving a package comprises an arm, a first joint coupled to an end of the arm, and an end effector coupled to the first joint, the end effector comprising a fixed suction cup, one or more rails, and at least one movable suction cup, wherein each movable suction cup is moveably attached to the one or more rails such that each movable suction cup can move along the rail, and wherein the first joint has two or more degrees of freedom in order to rotate the end effector.

In some embodiments, at least one of the one or more rails extends out linearly from the end effector. In some further embodiments, at least one of the one or more rails comprises one or more adjustable angles.

In some embodiments, the first joint is a wrist joint. In some further embodiments, the first joint is a spherical motor joint.

In some embodiments, the end effector is coupled to the first joint via a longitudinal extension, the longitudinal extension comprising a spring allowing the longitudinal extension to be extended or retracted in linear motion.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the present disclosure in any way. It will be appreciated that the scope of the present disclosure encompasses many potential embodiments in addition to those here summarized, some of which will be further described below. Other features, aspects, and advantages of the subject matter will become apparent from the description, the drawings, and the claims.

BRIEF DESCRIPTION OF THE DRAWINGS

Figure 1:
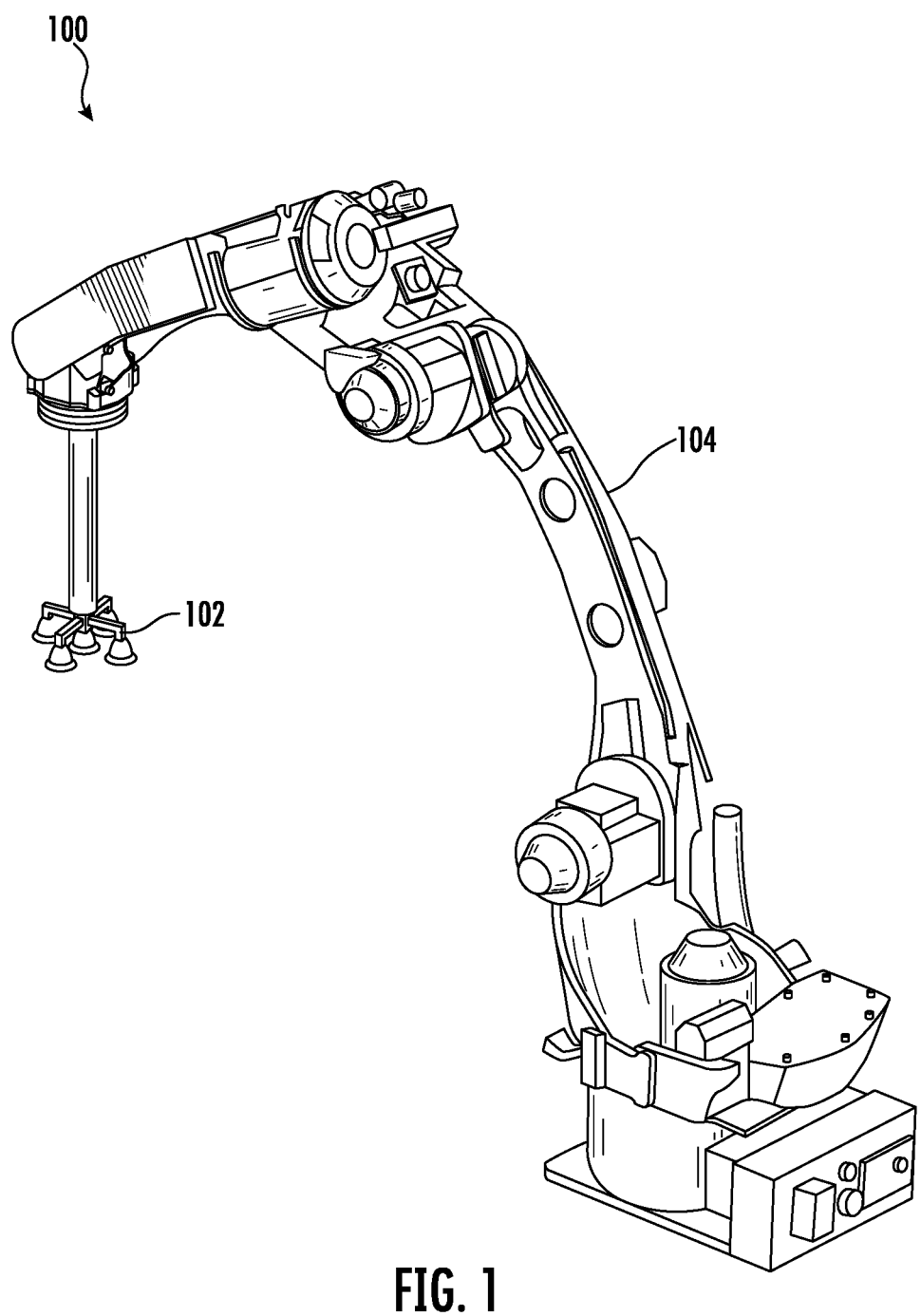

Having thus described certain example embodiments of the present disclosure in general terms above, non-limiting and non-exhaustive embodiments of the subject disclosure are described with reference to the following figures, which are not necessarily drawn to scale and wherein like reference numerals refer to like parts throughout the various views unless otherwise specified. The components illustrated in the figures may or may not be present in certain embodiments described herein. Some embodiments may include fewer (or more) components than those shown in the figures.

FIG. 1 illustrates an example robotic arm with an end effector in accordance with various aspects and embodiments of the subject disclosure.

Figure 2:
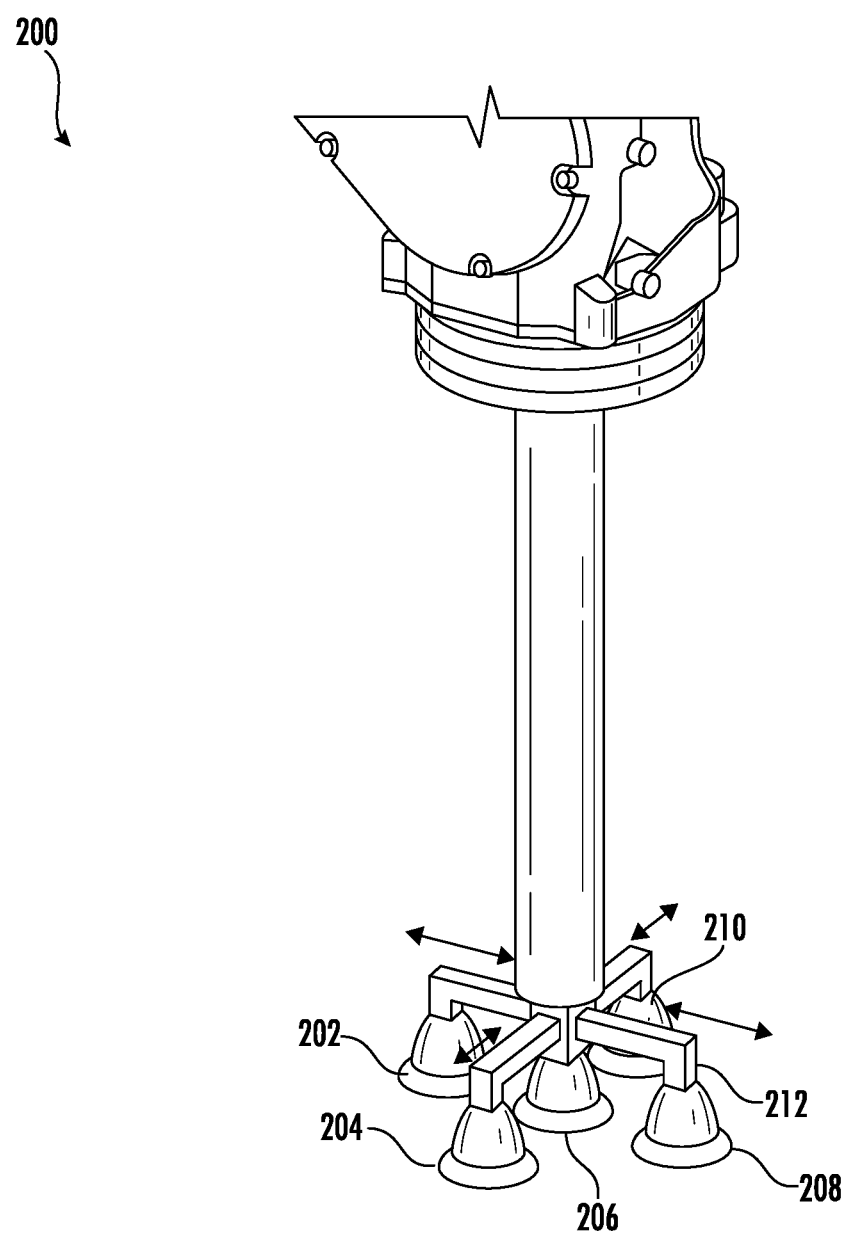

FIG. 2 illustrates an example end effector of a robotic arm with moveable suction cups in accordance with various aspects and embodiments of the subject disclosure.

Figure 3:
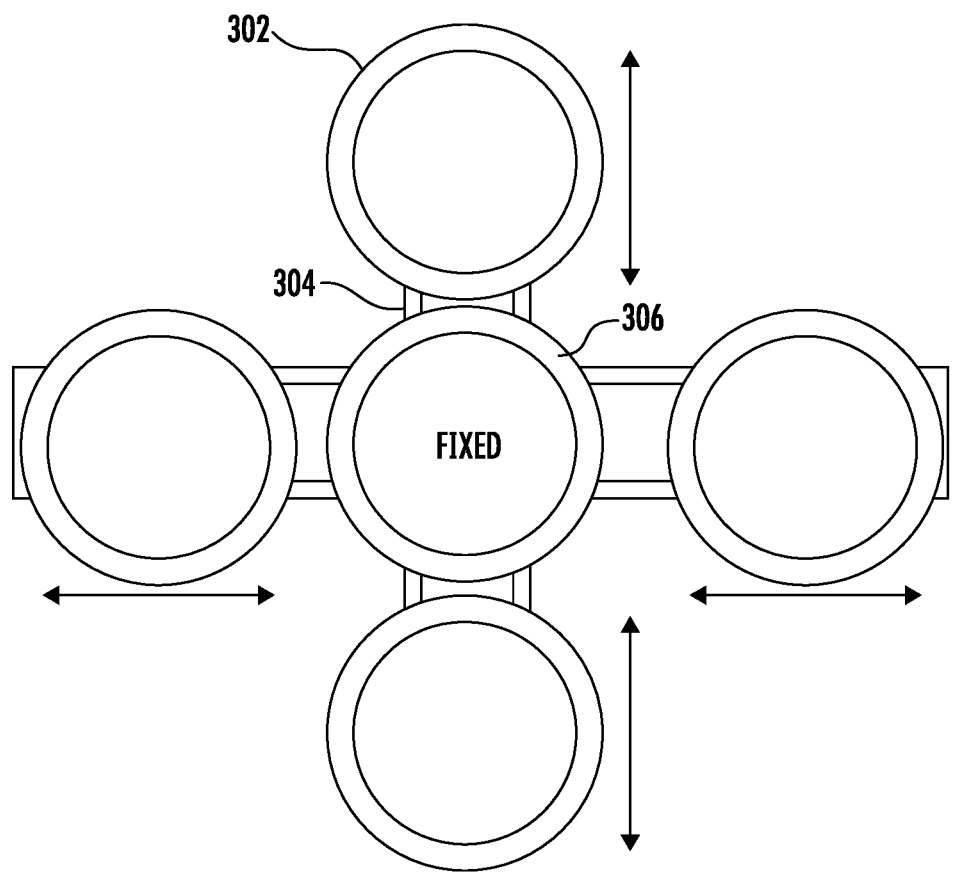

FIG. 3 illustrates an example end effector of a robotic arm with moveable suction cups in accordance with various aspects and embodiments of the subject disclosure.

Figure 4:
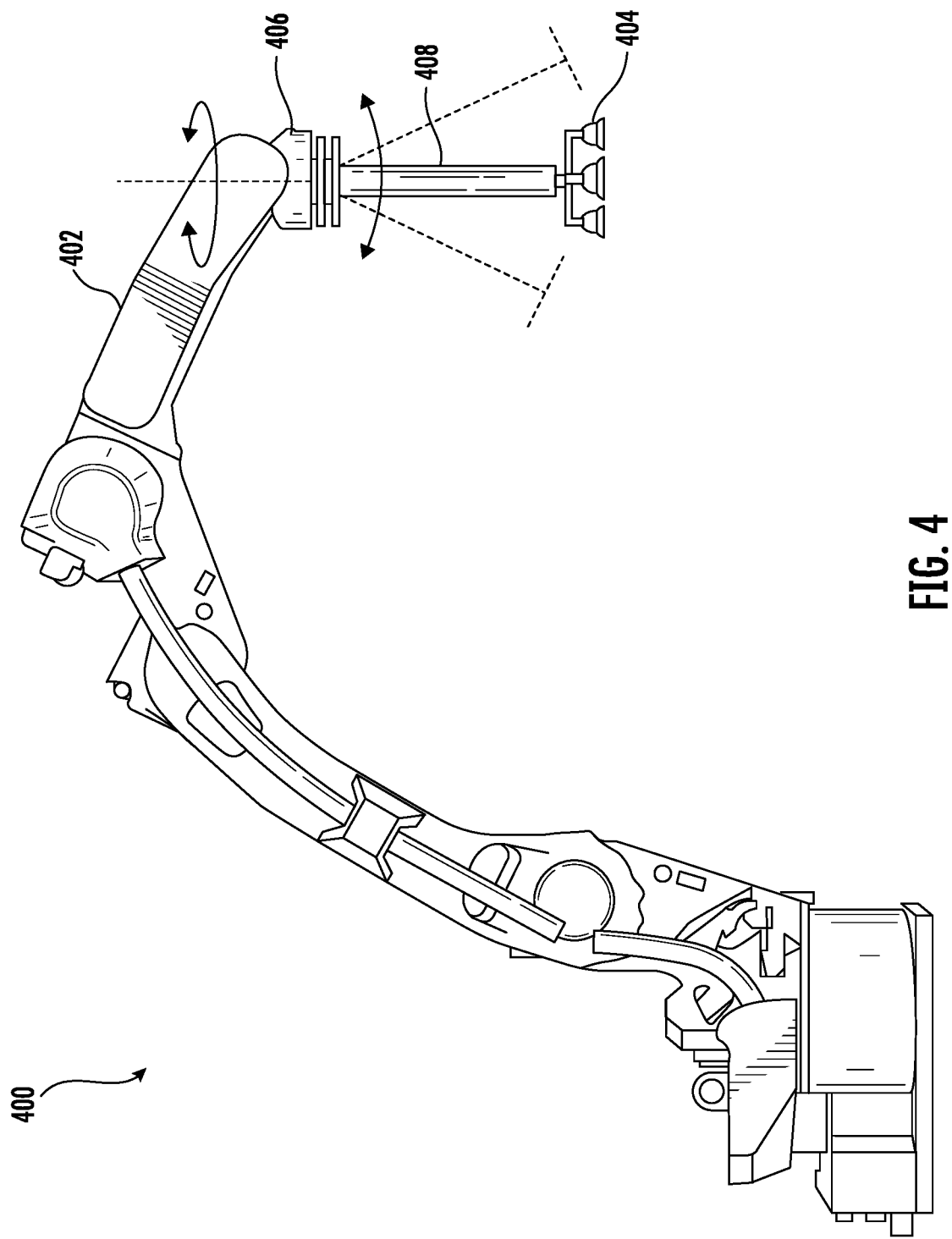

FIG. 4 illustrates an example robotic arm employing anti-sway control actions in accordance with various aspects and embodiments of the subject disclosure.

Figure 5:
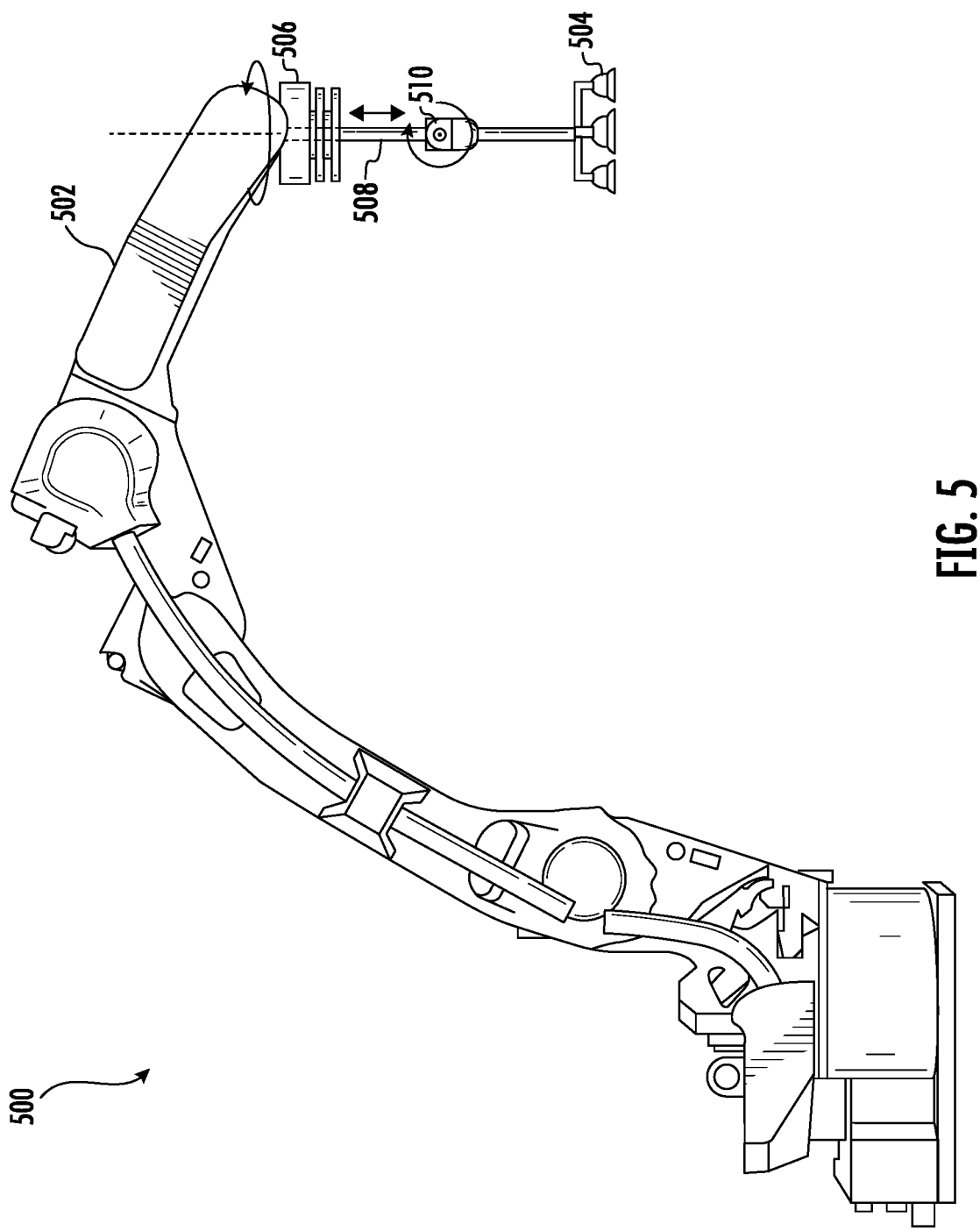

FIG. 5 illustrates an example robotic arm employing anti-sway control actions in accordance with various aspects and embodiments of the subject disclosure.

Figure 6:
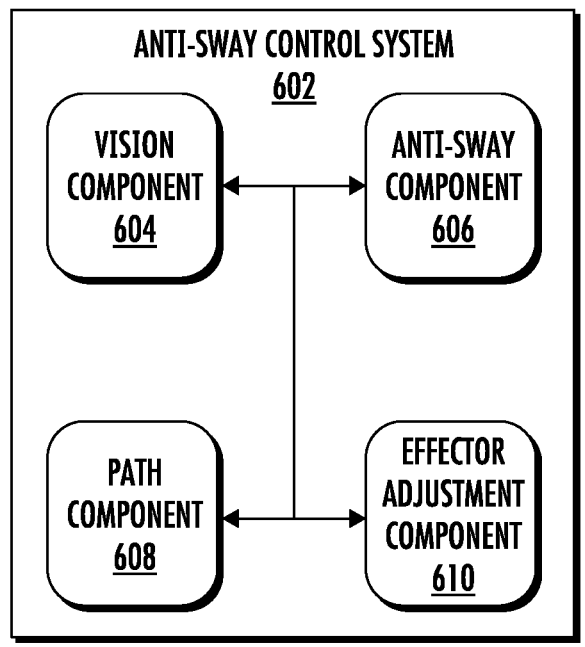

FIG. 6 illustrates an example block diagram of an anti-sway control system in accordance with various aspects and embodiments of the subject disclosure.

Figure 7:
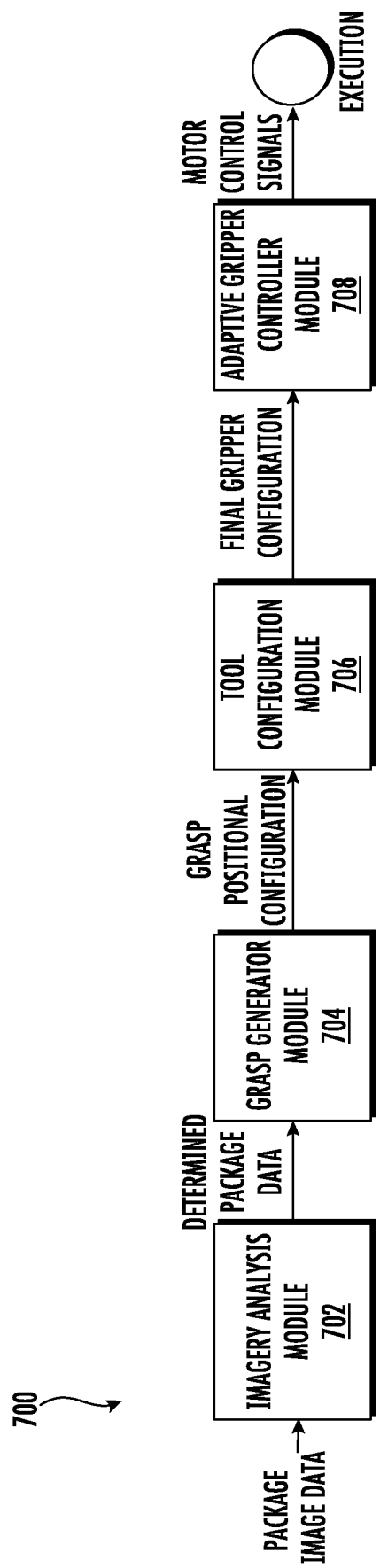

FIG. 7 illustrates an example block diagram of an anti-sway control system in accordance with various aspects and embodiments of the subject disclosure.

Figure 8:
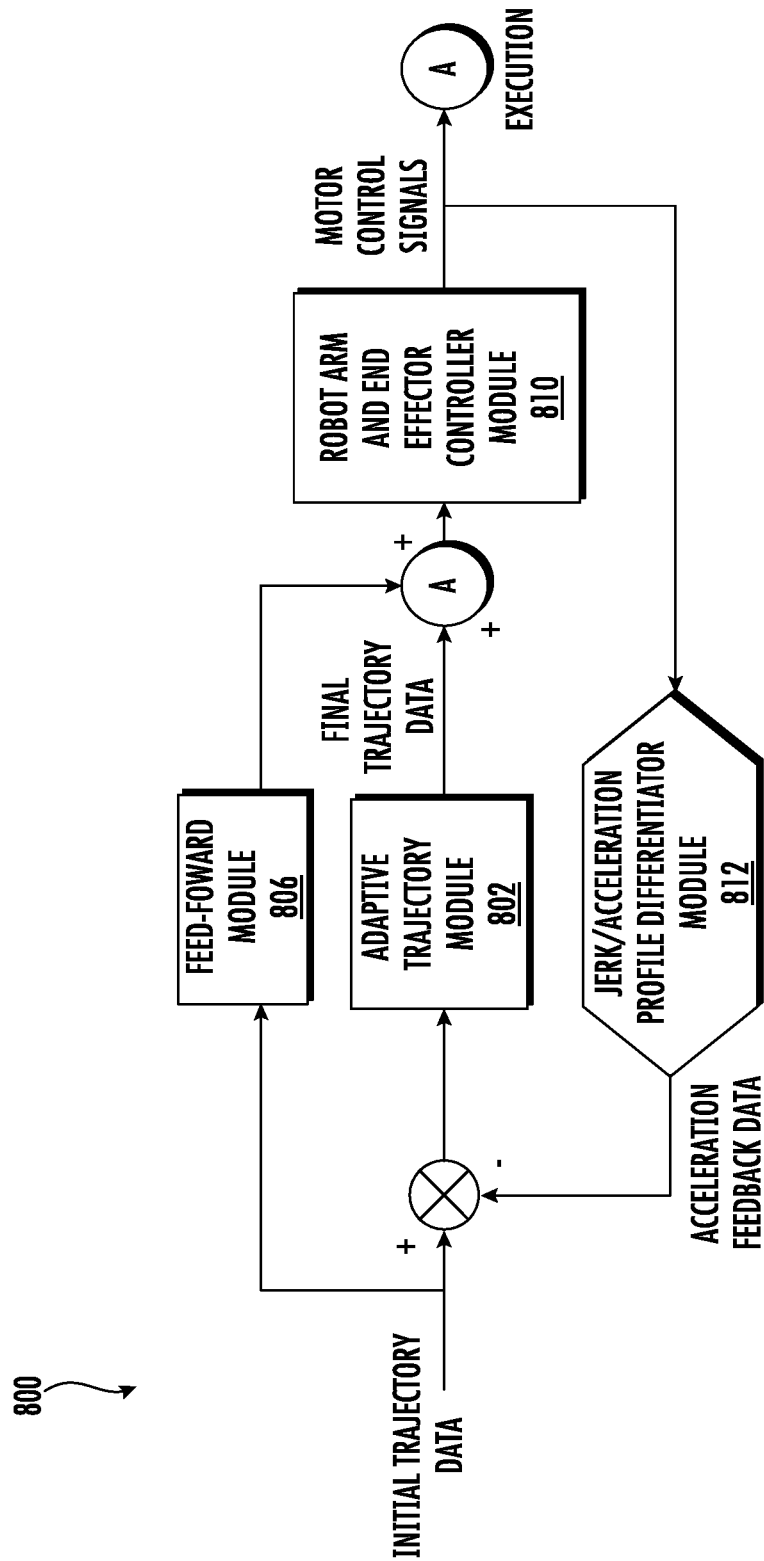

FIG. 8 illustrates an example block diagram of an anti-sway control system in accordance with various aspects and embodiments of the subject disclosure.

Figure 9:
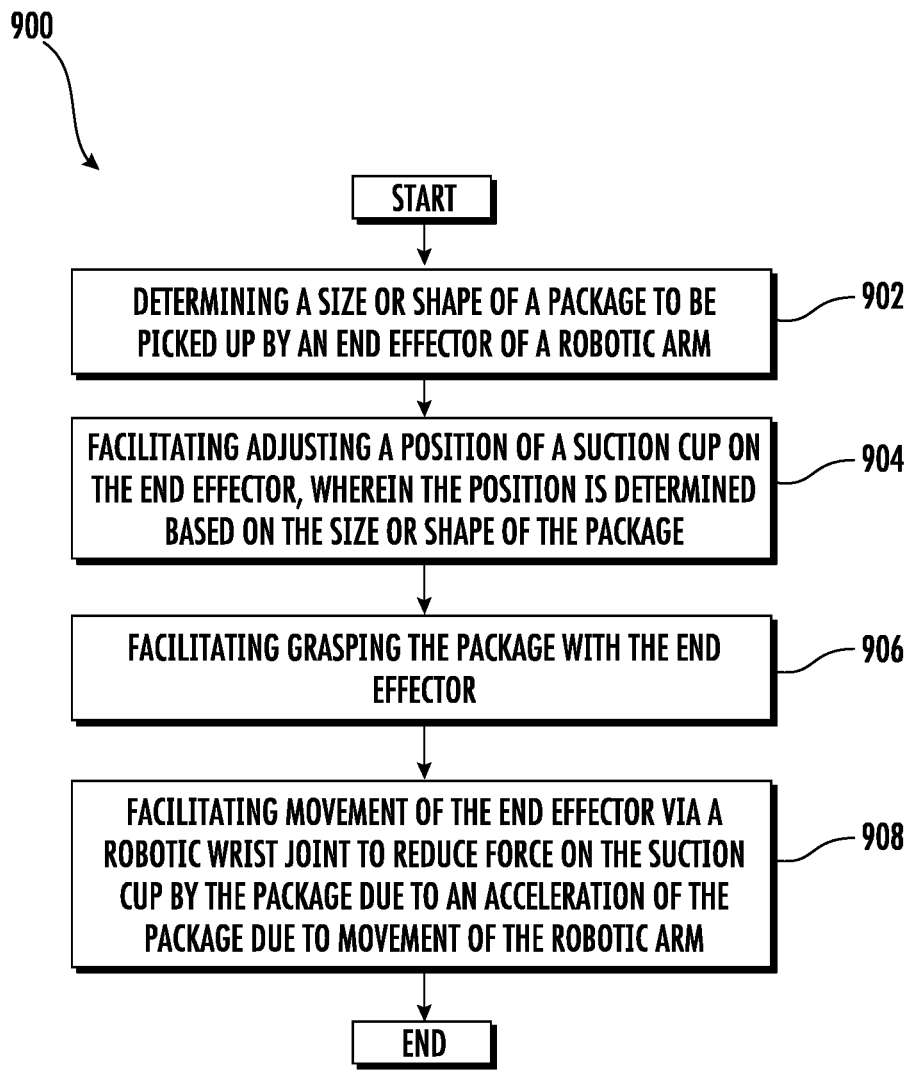

FIG. 9 illustrates an example method for performing anti-sway control and effector adjustment in accordance with various aspects and embodiments of the subject disclosure.

Figure 10:
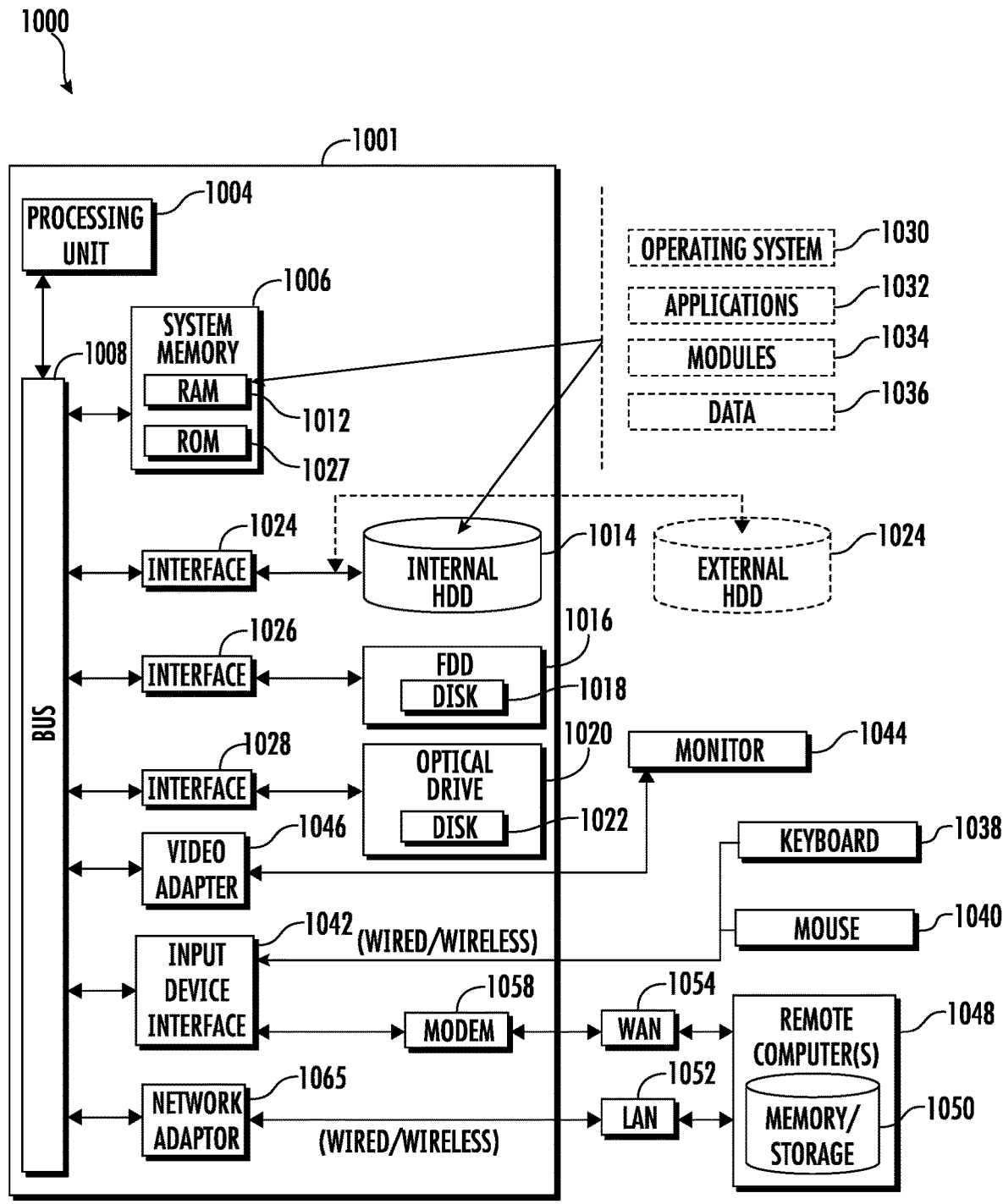

FIG. 10 illustrates an example block diagram of a computer that can be operable to execute processes and methods in accordance with various aspects and embodiments of the subject disclosure

DETAILED DESCRIPTION

One or more embodiments are now more fully described with reference to the accompanying drawings, wherein like reference numerals are used to refer to like elements throughout and in which some, but not all embodiments of the inventions are shown. In the following description, for purposes of explanation, numerous specific details are set forth in order to provide a thorough understanding of the various embodiments. It is evident, however, that the various embodiments can be practiced without these specific details. It should be understood that some, but not all embodiments are shown and described herein. Indeed, the embodiments may be embodied in many different forms, and accordingly this disclosure should not be construed as limited to the embodiments set forth herein. Rather, these embodiments are provided so that this disclosure will satisfy applicable legal requirements. As used herein, the description may refer to a robotic arm as an example "apparatus" or an anti-sway control system as an example "system". However, elements of the apparatus and/or system described herein may be equally applicable to the claimed method and computer program product. Accordingly, use of any such terms should not be taken to limit the spirit and scope of embodiments of the present disclosure.

Various embodiments disclosed herein provide for an anti-sway control system for a robotic arm and an adjustable end effector for the robotic arm that can reduce sway due to packages being moved or otherwise contacted by a robotic arm. A robotic arm, such as a robotic arm having an end effector with suction cup gripper(s) that are limited to a small fixed area, may allow the contents inside a package to move when not under suction pressure. For example, when a package has a larger surface area than the fixed surface area covered by a gripper, the contacts of the package may be able to sway. When the gripper engages only a small portion of the surface area of the package, the contents of the package, in an instance of the robotic arm being moved, may move, causing the package to pivot about an axis that is perpendicular to the gripper surface, thus leading to an undesirable swaying, pendulum effect when in contact with the robotic arm, and in some instances, the swaying may result in the package becoming detached from the end effector of the robotic arm. It is also undesirable, as a result of a robot arm acceleration and deceleration along the trajectory of a package to a goal position, for the hold of a suction cup on the package to be reduced due to forces exerted on the end effector. In such cases, the hold of the end effector may be lost resulting in the package getting thrown off the hold of the robot arm, and/or the package getting flipped over unintentionally when being placed on the goal position.

As a result of these problems and others that may arise from time to time, it is desirable to reduce the sway caused by such materials handling in order to enable the robotic arm to increase the speed of movement and reduce the likelihood of a package detaching from the end effector on the robotic arm. Accordingly, to overcome these problems and others, various embodiments of the present disclosure relate generally to an improved adaptable or adjustable end effector, in some examples, for the robot/robotic arm, the adaptable or adjustable end effector configured to grasp packages of different types (e.g., rigid boxes, non-rigid poly bags, and/or the like), sizes, shapes, and/or orientations. Alternatively or additionally, various embodiments of the present disclosure relate generally to an anti-sway control system for a robot/robotic arm that can reduce the sway due to packages being moved by a robotic arm, allowing for better preservation of package quality, a reduction in downtime, reduction in human intervention, and increased throughput and efficiency in a material handling environment.

In various embodiments, an anti-sway control system can comprise a processor and a memory that stores executable instructions that, when executed by the processor, facilitate performance of operations of the present disclosure. In some embodiments, the operations can include determining a size, shape, 2D location, and/or three-dimensional (3D) orientation of a package to be picked up by an end effector of a robotic arm. In some further embodiments, the operations can also include adjusting a position of a suction cup on the end effector, wherein the position is determined based on the size, shape, 2D location, and/or 3D orientation of the package. In still further embodiments, the operations can also include facilitating grasping the package with the end effector. In still further embodiments, the operations can also include facilitating movement of the end effector via a robotic joint, such as a robotic wrist joint or a robotic spherical motor joint, to reduce an acceleration of the package due to movement of the robotic arm.

As used in this disclosure, in some embodiments, the terms "component," "system", and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments disclosed herein can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In accordance with various embodiments described herein, an anti-sway control system can smooth and/or reduce the acceleration and/or deceleration experienced by a package being moved via a robotic arm or robot from a first location to a goal location, which can allow the robotic arm to move the packages faster and reduce the damage caused to the packages by the movement of the robotic arm. The anti-sway control system can be a combination of a hardware and a software solution. In some embodiments, a custom end effector on the robot arm can be used that has 1 or more, and in some examples 5 or more, suction cup. In some examples, the custom end effector is mounted with at least 2 degrees of freedom. In some embodiments, the anti-sway control system is configured to modify the motion of the robot arm along the trajectory of the path to move the package from a first location to a goal location in order to minimize the forces on the end effector that reduces the hold of the suction cup(s) over the package(s).

In some embodiments, one or more image sensor(s), such as a camera(s), mounted on the robotic arm or on another mounting, can take one or more image(s) of a package to be picked up, and will submit the image(s) as input to a deep learning-based perception algorithm, that can identify the size of the package, the shape of the package, the 3D orientation of the package, and/or its 2D location on a first location, such as the pick-up location.

In some embodiments, based on one or more of such identifications/determinations (e.g., the size of the package, the shape of the package, the 3D orientation, 2D location of the package, etc.), the end effector is configured to adjust the area of coverage of the suction cups in real-time. In some examples, adjusting the area of coverage may maintain the center of gravity or the center of mass of the package close to the end effector, hence reducing the pendulum effect.

In some embodiments, the anti-sway control system can also generate a route that reduces the acceleration and/or deceleration experienced by the package. The anti-sway control system can also determine a series of movements to maneuver the end effector via a joint, such as a robotic wrist joint or a robotic spherical motor joint, a swivel joint of the robotic arm, and/or via longitudinal extension/retraction of the robotic arm. For example, in a non-limiting exemplary embodiment, the end effector can use one or more degrees of freedom in a robotic wrist joint to oscillate the package in the opposite direction of trajectory to counter the forces of the package on the end effector. In some embodiments, this oscillation is based on the inverse of the transfer function of the motion of the robot to a goal position with a time response quick enough to rapidly adjust to the trajectory of the robot. In some embodiments, the motion planner can also be trained using reinforcement learning to counteract the forces on the end effector and the robot wrist joint or spherical motor joint by increasing the reward function inversely proportional to torque on the robot wrist joint or spherical motor joint. This will further create smoother trajectories that prevent packages from swinging.

Turning now to FIG. 1, illustrated is example embodiment 100 of an example robotic arm with an end effector in accordance with various aspects and embodiments of the subject disclosure. As depicted in the exemplary embodiment 100 of FIG. 1, a robotic arm 104 can have an end effector 102 (e.g., a gripper) that can be used to grip packages and the robotic arm can move the end effector 102 to a different position via a series of one or more joints in order to pick up the package or article from one location and drop/place/set the package or article at a different, goal location. In various embodiments, the end effector 102 of the robotic arm can have one or more suction cup grippers or soft grippers disposed on one or more rails of the end effector 102. In a non-limiting exemplary embodiment, one or more of the suction cup(s) hold the package(s) via a contact with the suction cup(s).

Turning now to FIG. 2, an exemplary end effector 200 is shown with multiple suction cups (e.g., 202, 204, 206, 208, and 210). In some embodiments, one or more of the suction cups (e.g., 206) can be fixed, while the remaining suction cups (e.g., 202, 204, 208, and 210) can be moved into one or more of a plurality of positions along the respective rails (e.g., rail 212). In some embodiments, the position of a suction cup (e.g., 202, 204, 208, and 210) can be determined based on a determined size, shape, 3D orientation, and/or location (e.g., 2D location) of the package to be moved. In some embodiments, the suction cups can be positioned such that the center of mass of the package stays close to the end effector or suction cups to reduce the amount of sway of the package. For example, in some embodiments, the package can be a box or a non-rigid, soft package (e.g., a poly bag). Soft packages can be particularly susceptible to sway if there is only one suction cup. As the suction cup grasps the package, the item in the package may fall away from the suction cup, thereby creating a pendulum effect (e.g., swaying). By having multiple suction cups and by being able to adjust the positioning of one or more such suction cups based on the size, shape, 3D orientation, and/or location (e.g., 2D location) of the package, the pendulum effect can be reduced, thus reducing the sway forces during movement of the package by the robotic arm. It is to be appreciated that in some embodiments, there can be fewer than or greater than the five depicted suction cups, and that in some embodiments, there may not be a fixed suction cup (e.g., each of the suction cup(s) can be repositioned).

Turning now to FIG. 3, illustrated is another embodiment of the end effector with a fixed central suction cup 306, at least one rail 304, and at least one moveable suction cup 302 that can move along the rail 304. In some embodiments, there may just be one rail with suction cups that extend out linearly. In some embodiments, there may be multiple rails, each with one or more suction cup(s), that extend out and/or retract linearly. In other embodiments, the angles of the rails with respect to each other can also be adjusted to allow the end effector to pick up packages with different shapes and/or orientations.

Turning now to FIG. 4, illustrated is an embodiment showing a robotic arm 402 utilized to transport a package in accordance with various aspects of the subject disclosure. In the depicted embodiment, the robotic arm 402 has a wrist joint 406 that has 2 or more degrees of freedom in order to rotate (e.g., swing) the end effector 404, the end effector 404 connected to the wrist joint 406 of the robotic arm 402 via a longitudinal extension 408. FIG. 4 illustrates one configuration of the joint (i.e., a wrist joint 406), however, various configurations are available without deviating from the intent of the present disclosure. For instance, although not depicted in FIG. 4, it is contemplated that in some embodiments, the robotic arm can employ a spherical motor joint in place of the wrist joint 406, the spherical motor joint allowing for rotating in multiple degrees of freedom. Such rotation of the end effector 404 by the joint (e.g., wrist joint 406, spherical motor joint, etc.) is configured to counteract the acceleration and/or deceleration of the robotic arm 402, so that the package attached to the end effector 404 experiences reduced acceleration and/or deceleration. Accordingly, any undesirable swaying or pendulum effect, unintentional detachment, and/or incorrect package placement at the goal position due to the acceleration and/or deceleration forces may be mitigated.

Turning now to FIG. 5, illustrated is another embodiment showing a robotic arm 502 utilized to transport a package in accordance with various aspects of the subject disclosure. In the depicted embodiment, the robotic arm 502 has a wrist joint 506 that has 2 or more degrees of freedom in order to rotate (e.g., swing) the end effector 504, the end effector 504 connected to the wrist joint 506 of the robotic arm 502 via a motor-controlled longitudinal extension 508, and a motor-controlled swivel joint 510. Such rotation, longitudinal motion, and/or swivel motion of the end effector 504 via one or more of the wrist joint 506, longitudinal extension 508, and swivel joint 510 is configured to counteract the acceleration and/or deceleration of the robotic arm 502, so that the package attached to the end effector 504 experiences reduced acceleration and/or deceleration. For example, in some embodiments, the longitudinal extension 508 can be extended and/or retracted in a controllable linear fashion, the extension and retraction extending the degrees of freedom of the end effector 504. In a non-limiting exemplary embodiment, the linear motion is effected via a spring included in the longitudinal extension 508 connecting the end effector. Accordingly, any undesirable swaying or pendulum effect, unintentional detachment, and/or incorrect package placement at the goal position due to the acceleration and/or deceleration forces may be mitigated.

Turning now to FIG. 6, illustrated is an example block diagram 600 of an anti-sway control system 602 in accordance with various aspects and embodiments of the subject disclosure. In an embodiment, anti-sway control system 602 can be a device, server, or other control system that can receive sensor input (e.g., camera, pressure, etc.) and direct the movement and actions of a robotic arm and/or the end effector of the robotic arm. In an embodiment, the anti-sway control system 602 can be located at either the robotic arm itself or can be part of a computer or server not attached to the robotic arm. In other embodiments, the anti-sway control system 602 can be cloud-based, or centrally located apart from the robotic arm.

The anti-sway control system 602 may include various means, such as vision component 604, anti-sway component 606, path component 608, and/or effector adjustment component 610. The anti-sway control system 602 may be configured, using one or more of the components 604, 606, 608, and 610 to execute any one or more of the operations described herein.

In an embodiment, the anti-sway control system 602 can include a vision component 604 that controls one or more image sensor(s), such as a camera, and/or receives one or more images from the camera placed to view a package or group of packages to be picked up. In some embodiments, the vision component 604 can also include a machine learning based perception model (e.g., a deep learning-based perception algorithm) designed to leverage artificial intelligence to infer and/or determine a size of the package, a shape of the package, a 3D orientation of the package, a location of the package (e.g., 2D location), and/or an optimum placement of suction cup(s) on the package in order to keep the center of mass of the package as close to the end effector as possible. By way of example, the vision component 604 can employ the machine learning based perception model to infer and/or determine the size, shape, 3D orientation, 2D location, and/or an optimum placement of the suction cup(s) on the package to be picked up based on one or more images (e.g., image data) from the camera. In an aspect, the machine learning based perception model employed by the vision component 604 can be a machine learning model that is trained for package size estimation, package shape estimation, package orientation estimation, package location estimation, and/or suction cup placement estimation.

In another aspect, the one or more images can be provided as input to the machine learning based perception model. In an embodiment, the machine learning based perception model can be a neural network (e.g., artificial neural network, convolutional neural network, or the like) that is trained to, in real-time or near real-time, identify package size, package shape, 3D orientation, 2D location, and/or optimum placement of the suction cup(s) from image data. For instance, in an embodiment, a convolutional neural network can be a deep neural network that is trained to analyze visual imagery. In some embodiments, the anti-sway control system 602 retrieves and utilizes historical visual imagery data (e.g. one or more historical images of packages or group of packages) for a model training set, training the model by predictively analyzing various impacts of package size, shape, 3D orientation, 2D location, suction cup(s) placements of historical packages, and correlations thereof. In still further embodiments, the anti-sway control system 602 continually analyzes visual imagery data resulting in a positive feedback loop to continually improve and refine the machine learning based perception model. In some embodiments, determination of the package size, package shape, 3D orientation, 2D location, and/or optimum placement of suction cup(s) on the package may include supplying one or more images to the machine learning based perception model in order to analyze the one or more images (e.g., image data) to identify the package (e.g., presence, etc.) and output an associated determined package size, package shape, 3D orientation, 2D location, and/or optimum suction cup(s) placement.

In some embodiments, the anti-sway control system 602 can include an effector adjustment component 610 configured to provide instructions to the end effector to position and/or reposition one or more suction cups. For example, in some embodiments, the instructions may comprise suction cup position data to position and/or reposition one or more suction cups in accordance with the determined optimum placement of the suction cup(s) and/or based on the determined size, shape, 3D orientation, and/or 2D location of the package.

In some embodiments, the anti-sway control system 602 can include a path component 608 which can determine a path for the robotic arm to make in order to move and/or relocate the package to the goal position while minimizing the jerks, acceleration, and/or deceleration of the package due to movement/positional changes. For example, in some embodiments, the anti-sway control system can generate a route that reduces the acceleration and/or deceleration experienced by the package.

In some embodiments, the anti-sway control system 602 can include an anti-sway component 606. For example, in some embodiments, in an instance in which the anti-sway component 606 determines that the shear force on the package is above a predetermined force level due to the acceleration on the package due to the robotic arm, the anti-sway component 606 can facilitate movement of the end effector around the wrist joint (e.g., the wrist joint attaching the end effector to the robotic arm) in order to counteract the acceleration due to the robotic arm movement. These movements can effectively reduce the shear force below a predetermined level and allow the robotic arm to move the package more quickly, with a lower risk of the package being damaged or coming detached from the robotic arm.

FIG. 7 illustrates an example block diagram of an anti-sway control system 700 configured to determine, generate, and execute optimal suction cup placement of an end effector in accordance with various aspects and embodiments of the subject disclosure. In an embodiment, an imagery analysis module 702 receives package image data via one or more image sensor(s) (not depicted). The one or more image sensor(s) (e.g., camera, etc.) are mounted on the robotic arm, another mounting, and/or otherwise disposed and configured to capture one or more images of a package to be picked up by the robotic arm. In some embodiments, the package image data comprises one or more of RGB data, 2D data, and 3D data. The imagery analysis module 702 utilizes a machine learning based perception model that is trained to determine, in real-time or near real-time, package size, package shape, 3D orientation, and/or 2D location of the package from analysis of such package image data. For instance, in an embodiment, the imagery analysis module 702 can be a deep neural network, such as a convolutional neural network applying a deep learning-based perception algorithm, that is trained to analyze visual imagery, such as the package image data, to determine package size, package shape, 3D orientation, and/or 2D location of the package in a pick-up location. In some embodiments, the imagery analysis module 702 retrieves and utilizes historical package image data (e.g. one or more historical images of packages or group of packages) for a model training set, training the model by predictively analyzing various impacts of package size, package shape, 3D orientation, 2D location, and correlations thereof. It is contemplated that such training can occur before the robot arm is operational and/or while the robot arm is operational. In still further embodiments, the imagery analysis module 702 continually analyzes image data received during operation (e.g., while online) resulting in a positive feedback loop to continually improve and refine the machine learning based perception model.

In some embodiments, the imagery analysis module 702 outputs the determined package data (e.g., package size, package shape, 3D orientation, and/or 2D location of the package) to a grasp generator module 704. The grasp generator module 704 is configured to generate a grasp positional configuration for each of the one or more suction cup(s) of the end effector of the robot arm based on such input (e.g., the determined package size, package shape, 3D orientation, and/or 2D location of the package to a grasp generator module 704). The grasp positional configuration(s) indicate where each of the suction cup(s) are to be placed on the imaged package. For example, in some embodiments, the grasp positional configuration(s) indicating where each of the suction cup(s) are to be placed in order for the robotic arm to pick up the package at the center of gravity, i.e., so that the corresponding grasp via the suction cup(s) of the end effector is stable.

In some embodiments, the generated grasp positional configuration(s) are provided by grasp generator module 704 as input to a tool configuration module 706 to generate a final gripper configuration. In some embodiments, the final gripper configuration provides the dimensional instructions for extending, retracting, and/or adjusting the angle(s) of one or more rail(s) of the end effector to which the suction cup(s) are attached. To provide context, the dimensional instructions configure the grasp of the suction cup(s) for the size of the package. In a non-limiting example, a small cube-shaped package and a large cube-shaped package may be of generally the same shape, resulting in approximately the same grasp positional configuration(s) to be generated, however, the dimensional instructions may require, for example, extending the length of one or more rails to scale up for the size of the large cube-shaped package, while retracting the length of one or more rails to scale down for the size of the small cube-shaped package.

In some further embodiments, the tool configuration module 706 outputs the final gripper configuration to an adaptive gripper controller module 708. In some embodiments, the adaptive gripper controller module 708 generates the corresponding gripper motor controls (e.g. control signals) for executing the final gripper configuration. To provide context, the adaptive gripper controller module 708 generates motor control signals for controlling the end effector to position the suction cup(s) and/or rail(s) to adjust the area of coverage of the suction cup(s), in real-time or near real time. Such adaptive end effector control helps to keep the center of gravity or the center of mass of the package close to the end effector, hence reducing the pendulum effect.

FIG. 8 illustrates an example block diagram of an anti-sway control system 800 configured to determine, generate, and execute optimal trajectory controls for a robot arm and/or end effector in accordance with various aspects and embodiments of the subject disclosure. In an embodiment, an adaptive trajectory module 802 receives initial trajectory data from a motion planner (not depicted). In some embodiments, the initial trajectory data comprises one or more initial trajectory parameters associated with joint position(s), velocity(ies), and/or acceleration for one or more waypoints in joint space in order to move a package along a path from a first position (e.g., pick up location) to a second position (e.g., goal location).

In some embodiments, the initial trajectory data is also provided as input to a feedforward module 806, the feedforward module 806 measuring and accounting for potential disturbance or deviations in the system and providing at least a portion of the initial trajectory data directly to the robot arm and end effector controller module(s) 810 in order to compensate for such potential disturbances or deviations before they can affect the system.

Returning to the adaptive trajectory module 802, in some embodiments, the adaptive trajectory module 802 generates final trajectory data based on the initial trajectory data and acceleration feedback data, as explained herein. The adaptive trajectory module 802 outputs such final trajectory data to the robot arm and end effector controller module 810.

After the adaptive trajectory module 802 outputs final trajectory data to the robot arm and end effector controller module 810, the robot arm and end effector controller module 810 generates the corresponding robot arm and effector motor controls (e.g. motor control signals) for executing the final trajectory. To provide context, the robot arm and end effector controller module 810 generates control signals for controlling the one or more of the joint(s), longitudinal extension, and/or end effector of the robot arm, in real-time or near real time, in order to move the package from the pick up location to the goal location via a smooth and minimum-jerk trajectory as discussed herein.

As depicted in FIG. 8, in some embodiments, the anti-sway control system 800 is further configured to modify jerk/acceleration profiles of the trajectory by outputting jerk/acceleration profiles of the robot and effector motor controls to the jerk/acceleration profile differentiator module 812. In some embodiments, the jerk/acceleration profile differentiator module 812 modifies such jerk/acceleration profiles and outputs such acceleration feedback data (e.g., joint values) in a feedback loop to be combined with the initial trajectory data inputted to the adaptive trajectory module 802. Such acceleration feedback data allows the adaptive trajectory module 802 to optimize the final trajectory data based on the acceleration feedback data in real time while the robot arm and end effector controller module 810 is executing the final trajectory, thereby resulting in a smooth and minimum-jerk final trajectory.

FIG. 9 illustrates an exemplary process in connection with the aforementioned systems. The process in FIG. 9 can, for example, be performed by, implemented by, with the assistance of, and/or under the control any one or more of the systems described above in FIGS. 1-8 respectively. While for purposes of simplicity of explanation, the methods are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described hereinafter.

FIG. 9 illustrates an example method 900 for performing a primary sort and a secondary sort in accordance with various aspects and embodiments of the subject disclosure.

In the embodiment illustrated in FIG. 9, method 900 can begin at 902 where the method includes determining a size or shape of a package to be picked up by an end effector of a robotic arm. In this regard, in some example embodiments, a camera is placed to view a package or group of packages to be picked up. In some embodiments, the camera and/or a vision component (e.g., vision component 604) that controls a camera and/or receives one or more images from the camera, includes a machine learning based perception model (e.g., a deep learning-based perception algorithm) designed to leverage artificial intelligence to infer and/or determine a size and/or a shape of the package. In some embodiments, determination of the package size and/or package shape includes supplying one or more images to the machine learning based perception model in order to analyze the one or more images (e.g., image data) to identify the package (e.g., presence, etc.) and output an associated determined package size, package shape, 2D location, and/or 3D orientation.

Thereafter, as shown at 904, the method includes facilitating adjusting a position of a suction cup on the end effector, wherein the position is determined based on the size or shape of the package. In this regard, in some example embodiments, a processor, a machine learning based perception model, and/or the like further outputs an associated position of a suction cup (e.g., determined optimal position) based on the determined size and/or shape of the package. In some embodiments, an effector adjustment component, for example, provides instructions to the end effector for positioning and/or repositioning a suction cup in accordance with the determined position of the suction cup.

Thereafter, as shown at 906, the method includes facilitating grasping the package with the end effector.

At 908, the method includes facilitating movement of the end effector via a robotic wrist joint to reduce force on the suction cup by the package due to an acceleration of the package due to movement of the robotic arm. For example, in some embodiments, facilitating movement of the end effector via a robotic wrist joint comprises determining a series of one or more movements to maneuver the end effector via the wrist joint that can use one or more degrees of freedom in the wrist joint to oscillate the package in the opposite direction of trajectory to counter the forces of the package on the robotic arm and/or end effector. In some embodiments, this oscillation is based on the inverse of the transfer function of the motion of the robot to goal position with a time response quick enough to rapidly adjust to the trajectory of the robot. In some further embodiments, the motion planner can also be trained using reinforcement learning to counteract the forces on the end effector and the robot wrist by increasing the reward function inversely proportional to torque on the robot wrist to create smoother trajectories that prevent packages from swinging.

Referring now to FIG. 10, there is illustrated a block diagram of a computer 1000 operable to execute the functions and operations performed in the described example embodiments. For example, a computing device (e.g., anti-sway control system 602) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the computing device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multiprocessor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a keyboard, hard keys, soft keys, a joystick, a game pad, a stylus pen, touch screen, touch areas, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 11 Mbps (802.11b) or 54 Mbps (802.11a) data rate, for example, or with products that contain both bands (dual band), so the networks can provide real-world performance similar to the basic "10BaseT" wired Ethernet networks used in many offices.

In some embodiments, the computer is operable to communicate with one or more network interface card(s), antenna(e), transmitter(s), receiver(s), bus(es), switch(es), router (s), modem(s), and supporting hardware and/or software, and/or firmware/software, or any other device suitable for enabling communications via one or more communication network(s). Additionally or alternatively, in some embodiments, the computer is operable to interact with the antenna (e) and/or other hardware, software, and/or firmware to cause transmission of signals via the antenna(e) or to handle receipt of signals received via the antenna(e). These signals may be transmitted by the computer using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

As employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

CONCLUSION

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the appended claims below. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An anti-sway control system, comprising:
   a processor; and
   a memory that stores executable instructions that, when executed by the processor, cause the processor to execute operations, the operations comprising:
      determining at least one of size, shape, or orientation of a package to be picked up by an end effector of a robotic arm;
      adjusting a position of a suction cup on the end effector to grasp the package by linearly moving the suction cup from an initial position on a rail associated with the end effector to a predetermined end position on the rail associated with the end effector, wherein the end position is determined based on the at least one of the determined size, shape, or orientation of the package; and
      controlling movement of the end effector via a robotic joint to reduce an acceleration of the package due to movement of the robotic arm.

2. The anti-sway control system of claim 1, wherein the controlling movement of the end effector via the robotic joint further comprises:
   oscillating the package in an opposite direction of trajectory motion to counter a force due to movement of the robotic arm.

3. The anti-sway control system of claim 2, wherein the oscillation of the oscillating package is based on an inverse of a transfer function of the motion of the robotic arm to a goal position.

4. The anti-sway control system of claim 2, wherein the oscillation of the oscillating package is facilitated via one or more of rotation of the robotic joint, linear motion of a longitudinal extension of the robotic arm, and swivel motion of the end effector.

5. The anti-sway control system of claim 1, wherein the determining the at least one size, shape, or orientation of the package is based on analyzing an image of the package.

6. The anti-sway control system of claim 1, wherein the position of the suction cup is adjusted based on a machine learning perception model.

7. The anti-sway control system of claim 1, wherein the position of the suction cup is adjusted based on a surface area of the package to increase grip on the package and bring a center of mass of the package closer to the end effector.

8. The anti-sway control system of claim 1, wherein the robotic joint is a wrist joint or a spherical motor joint.

9. A method, comprising:
   determining at least one of a size, shape, or orientation of a package to be picked up by an end effector of a robotic arm;
   adjusting a position of a suction cup on the end effector to grasp the package by linearly moving the suction cup from an initial position on a rail associated with the end effector to a predetermined end position on the rail associated with the end effector, wherein the end position is determined based on the at least one determined size, shape, or orientation of the package; and
   controlling movement of the end effector via a robotic joint to reduce force on the suction cup by the package due to an acceleration of the package due to movement of the robotic arm.

10. The method of claim 9, wherein the determining the at least one size, shape, or orientation of the package is based on analyzing an image of the package.

11. The method of claim 9, wherein the position of the suction cup is adjusted based on a machine learning based perception model.

12. The method of claim 11, wherein the machine learning based perception model is a convolutional neural network trained via historical package image data to determine an optimum placement of the suction cup.

13. A robotic arm apparatus for grasping and moving a package, the robotic arm apparatus comprising:
   an arm having a first joint; and
   an end effector coupled to the first joint, the end effector comprising a fixed suction cup, one or more rails, and at least one movable suction cup,
   wherein the fixed suction cup is fixed relative to the one or more rails and each of the at least one movable suction cup is movable relative to the one or more rails,
   wherein the end effector is connected to the arm via the first joint,
   wherein each of the at least one movable suction cup is moveably attached to the one or more rails such that each movable suction cup can move along the one or more rails, and wherein the first joint has two or more degrees of freedom in order to rotate the end effector.

14. The robotic arm apparatus of claim 13, wherein at least one of the one or more rails extends out linearly from the end effector.

15. The robotic arm apparatus of claim 13, wherein at least one of the one or more rails comprises one or more adjustable angles.

16. The robotic arm apparatus of claim 13, wherein the first joint is a wrist joint or a spherical motor joint.

17. The robotic arm apparatus of claim 13, wherein the end effector is coupled to the first joint via a longitudinal extension, the longitudinal extension comprising a spring allowing the longitudinal extension to be extended or retracted in linear motion.

18. The robotic arm apparatus of claim 13, wherein the first joint is configured to reduce an acceleration of the package.

19. The robotic arm apparatus of claim 13, wherein the first joint has two or more degrees of freedom in order to rotate the end effector on an axis that extends through the first joint.

20. The anti-sway control system of claim 1, wherein the rail associated with the end effector and the suction cup are configured to only allow a linear movement of the suction cup in relation to the rail.

\* \* \* \* \*